United States Patent [19]

Cullen et al.

[11] Patent Number: 4,992,410

[45] Date of Patent: Feb. 12, 1991

[54] OXYGEN-ABSORBING PACKAGE, COMPOSITION AND METHOD OF FORMULATION THEREOF

[75] Inventors: John S. Cullen, Buffalo; Nicholas E. Vaylen, Grand Island, both of N.Y.

[73] Assignee: Multiform Desiccants, Inc., Buffalo, N.Y.

[21] Appl. No.: 312,534

[22] Filed: Feb. 17, 1989

[51] Int. Cl.$^5$ .................... B01J 20/10; B01J 20/18; B01J 20/20

[52] U.S. Cl. ........................... 502/407; 502/60; 502/415; 502/417; 252/188.28; 426/395

[58] Field of Search ............... 502/407, 413, 417, 60, 502/415; 252/188.28; 426/395

[56] References Cited

U.S. PATENT DOCUMENTS

| | | | |
|---|---|---|---|
| 1,821,388 | 9/1924 | Maude et al. | 252/188.28 |
| 3,370,915 | 2/1968 | Sperberg | 502/407 |
| 4,127,503 | 11/1978 | Yoshikawa et al. | 252/429 R |
| 4,166,807 | 9/1979 | Komatsu et al. | 252/439 |
| 4,192,773 | 3/1980 | Yoshikawa et al. | 252/429 R |
| 4,230,595 | 10/1980 | Yamaji et al. | 252/188 |
| 4,406,813 | 9/1983 | Fujishima et al. | 252/188.28 |

FOREIGN PATENT DOCUMENTS

| | | | |
|---|---|---|---|
| 84538 | 6/1980 | Japan | 502/407 |
| 87852 | 5/1985 | Japan | 502/407 |
| 1212327 | 9/1986 | Japan | 502/407 |

*Primary Examiner*—Carl F. Dees
*Attorney, Agent, or Firm*—Joseph P. Gastel

[57] ABSTRACT

An oxygen-absorbing composition which will not absorb appreciable amounts of oxygen from the atmosphere during formulation and handling including a mixture of an oxygen-attracting component A, an aqueous electrolyte-impregnated component B, and a water-attracting component C which has a greater affinity for water from the electrolyte-impregnated component B than the oxygen-attracting component A and a greater affinity for water vapor from the atmosphere than the oxygen-attracting component so that the aqueous electrolyte from component B cannot appreciably react with the oxygen-attracting component A to absorb oxygen from the atmosphere during the time that water-attracting component C attracts water from component B and attracts water vapor from the atmosphere. A packet with a window therein for viewing the composition to determine whether, by change of color, it has absorbed oxygen. A method of formulating an oxygen-absorbing composition described above wherein the components A, B and C are mixed in the atmosphere shortly before packaging.

23 Claims, 1 Drawing Sheet

U.S. Patent  Feb. 12, 1991  Sheet 1 of 1  4,992,410
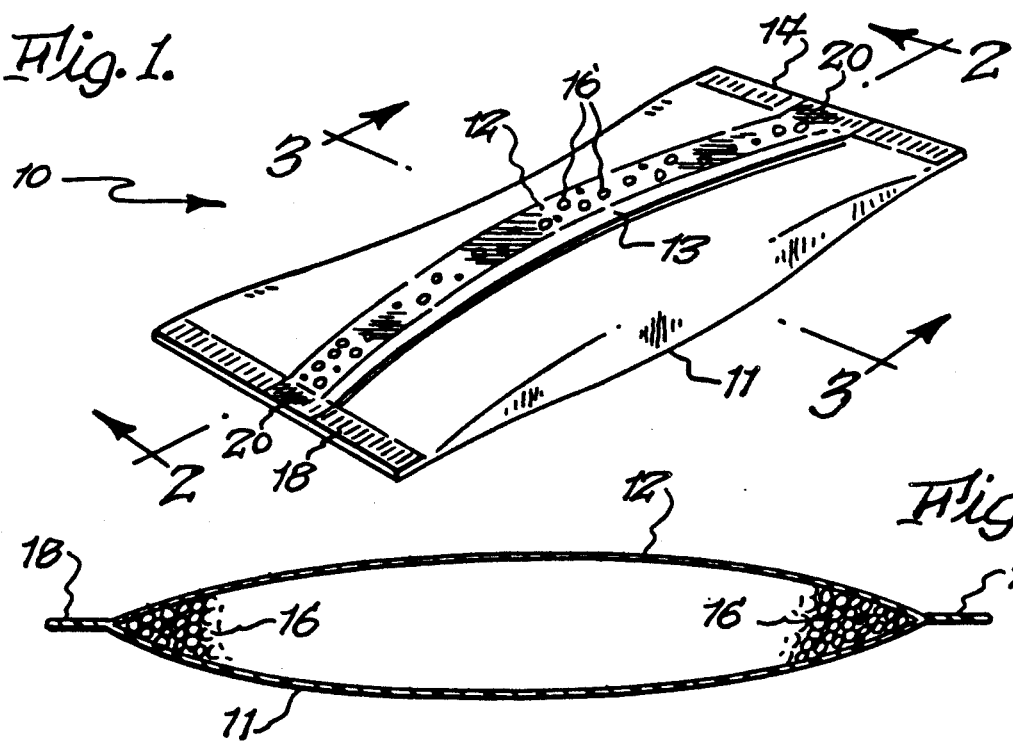
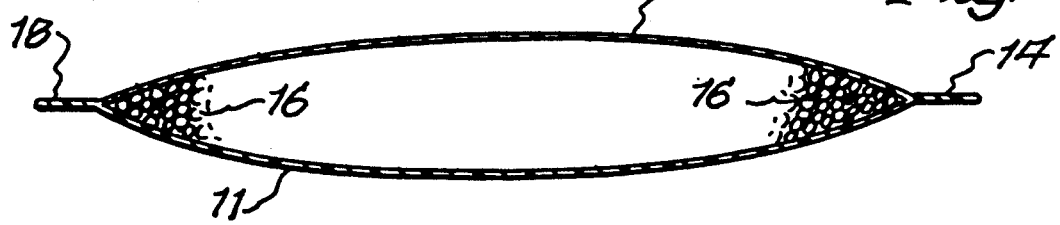
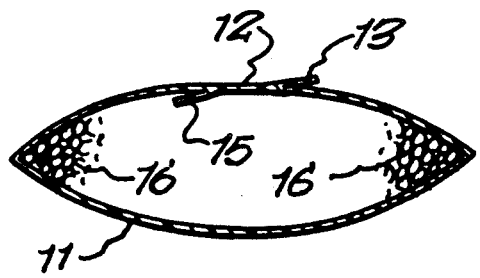
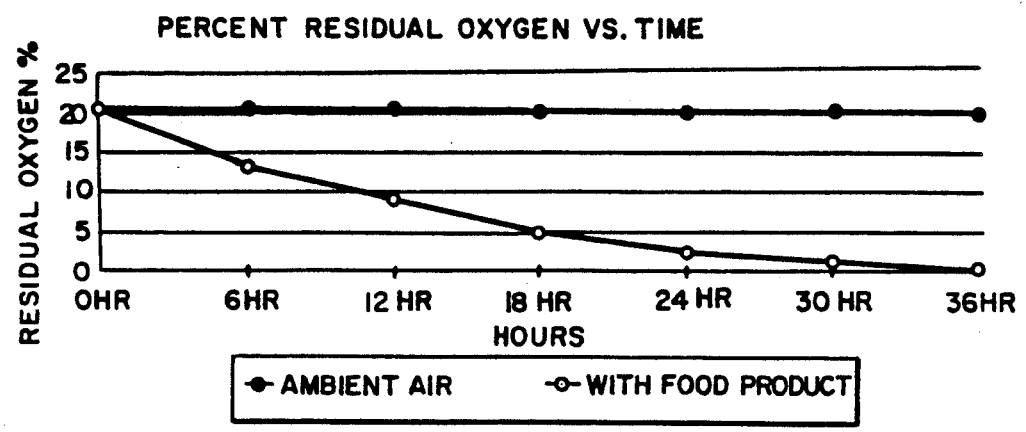

4,992,410

OXYGEN-ABSORBING PACKAGE, COMPOSITION AND METHOD OF FORMULATION THEREOF

BACKGROUND OF THE INVENTION

The present invention relates to an improved oxygen absorbing composition for use in environments wherein oxidation is to be prevented, a method of formulating said composition, and a packet containing said composition.

By way of background, certain foodstuffs, especially dairy products, such as quiche, cheese and the like, deteriorate in quality, especially by way of mold growth, when exposed to oxygen. Accordingly, in the past it has been common to add an oxygen-absorbing package to the product to prevent oxygen from combining with the product and thus deteriorating it. However, in the past oxygen-absorbing compositions could not be handled in the atmosphere for sufficiently long periods of time without losing their potency inasmuch as they rapidly absorbed oxygen from the air.

SUMMARY OF THE INVENTION

It is accordingly the primary object of the present invention to provide an oxygen-absorbing composition which at the time of formulation and for a period of time thereafter required for handling, it can be exposed to atmospheric oxygen without being deleteriously affected thereby.

It is another object of the present invention to provide a packet containing the foregoing composition, which will give a visible indication of the potency thereof.

A further object of the present invention is to provide a method for formulating an oxygen-absorbing composition which during the time of formulation will not absorb appreciable amounts of oxygen from the atmosphere while it is formulated under atmospheric conditions. Other objects and attendant advantages of the present invention will readily be perceived hereafter.

The present invention relates to an oxygen-absorbing composition which will not absorb appreciable amounts of oxygen from the atmosphere during formulation and handling comprising at the time of formulation in relatively sufficient proportions an oxygen-attracting component A, an aqueous electrolyte-impregnated component B, and a water-attracting component C which has a greater affinity for water from the electrolyte-impregnated component B than the oxygen-attracting component A and a greater affinity of water vapor from the atmosphere than the oxygen-attracting component A so that the aqueous electrolyte from aqueous electrolyte-impregnated component B cannot appreciably react with the oxygen-attracting component A to thereby prevent the oxygen-attracting component A from prematurely combining with atmospheric oxygen until such time as more of an equilibrium is reached between the electrolyte-impregnated component B and the water-attracting component C at which time the oxygen-attracting component A can react with oxygen in the presence of the electrolyte from the electrolyte-impregnated component B.

The present invention also relates to an oxygen-absorbing package containing the foregoing composition, the package having a transparent portion for viewing the contents of the package which contain iron which turns a reddish brown as it absorbs oxygen.

The present invention also relates to a method of formulating an oxygen-absorbing composition under atmospheric conditions comprising the steps of providing a particulate oxygen-absorbing component A, providing a liquid-adsorbing component B, providing an aqueous electrolyte-impregnated component C, and mixing components A, B and C in the atmosphere so that the liquid-adsorbing component B having a greater affinity for water from component C than component A and a greater affinity for water vapor from the atmosphere than component A will prevent said electrolyte from appreciably combining with said oxygen-absorbing component A until after there has been an amount of adsorption by component B of water from said electrolyte-impregnated liquid-adsorbing component C.

The various aspects of the present invention will be more fully understood when the following portions of the specification are read in conjunction with the accompanying drawings wherein:

BRIEF DESCRIPTION OF THE DRAWINGS

FIG. 1 is a perspective view of the improved oxygen-absorbing package of the present invention;

FIG. 2 is a fragmentary cross sectional view taken substantially along line 2—2 of FIG. 1;

FIG. 3 is a fragmentary cross sectional view taken substantially along line 3—3 of FIG. 1; and FIG. 4 is a graph showing the percent of residual oxygen in various containers under different circumstances.

DESCRIPTION OF THE PREFERRED EMBODIMENTS

The improved oxygen-absorbing package 10 of the present invention includes a wall portion 11 fabricated from a flexible planar sheet member which has been folded into tubular form and fused along overlapping edge portions 13 and 15 to provide a seam 12. The fusing is effected by placing the tubular shape over a mandrel and applying sufficient heat and pressure to fuse the area to be sealed. The end portion is then fused at 14 as by heat and pressure, and package 10 is filled with the oxygen-absorbing composition 16 described hereafter. Thereafter, the other end portion is fused at 18 in a crimped pattern, as by heat and pressure, to close the package. The portions 20 at end portions 18 are translucent so that when the packets 10 are formed in a strip, they can be separated by a shear which is activated by a light passing through the translucent portions 20. This packet structure is disclosed in detail in copending application Ser. No. 34,670, filed Apr. 6, 1987 now abandoned, but it contains bulk material but is not specifically directed to an oxygen-absorbing composition.

The entire package 10 is fabricated from spun-bonded polyolefin, which comprises high density polyethylene fibers which were combined by an integrated spinning and bonding process, and this material provides a number of highly desirable advantages. First of all, this material will transmit water vapor and gases from the environment in which package 10 is placed. However, this material will not pass water in liquid form. Therefore, package 10 will not have its efficacy impaired in the event it is exposed to liquid water nor will it permit liquid water in the oxygen-absorbing composition therein from passing out through the package to the environment in which it is located.

In addition to the foregoing, the virtually opaque spun-bonded polyolefin material 11 becomes transparent in the areas in which it has been fused. Therefore, the seam area 12 comprises a window extending longitudinally of package 10 which permits viewing of the oxygen-absorbing composition within the package. In this respect, as will become apparent hereafter, after the oxygen-absorbing composition within package 10 absorbs oxygen, it will turn a browish color which can be observed through window 12 to determine whether the oxygen-absorbing composition is still capable of absorbing oxygen or whether it is exhausted.

The material from which package 10 is fabricated is extremely strong, many times stronger than paper. It cannot be torn under normal use conditions and therefore this strength is a feature which is not obtainable with paper wall packages. Therefore, the possibility of spilling the oxygen-absorbing composition 16 from package 10 and permitting this composition to mix with a food product, such as quiche, with which it is packaged in another container, is practically impossible. Furthermore, the material of package 11 is noncorrosive in the sense that it is inert when compared to sulfur-bearing paper products and thus this material is manifestly suitable for packaging with food products, such as quiche which is deleteriously affected by exposure to oxygen. A spun-bonded polyolefin which has been found satisfactory can be obtained in various grades under the trademark TYVEK of the Dupont Company.

The package such as described above, except for the specific contents, is disclosed in U.S. Pat. No. 3,990,872, dated Nov. 9, 1976, and this patent is incorporated herein by reference. The reason that the package disclosed in the foregoing patent has been described here is because it has the above discussed advantages which are extremely relevant to food packaging, and it also permits viewing of the oxygen-absorbing composition through the window 12 for the purpose of determining whether it is still active to absorb oxygen or whether it is exhausted.

As noted above, a problem exists in the preparation of an oxygen-absorbing composition for placement into small packages or packets which are to be subsequently placed in containers, such as quiche containers, for absorbing oxygen which could deteriorate the product. The problem exists because the potency of oxygen-absorbing compositions is reduced during formulation and handling because they absorb oxygen from the atmosphere. More specifically, the oxygen-absorbing composition usually contains iron particles, or an equivalent, and a substance which carries an aqueous electrolyte solution. When this composition is exposed to atmospheric air, the iron oxidizes in the presence of the electrolyte, and thus its potency is reduced before it is actually packaged with a product, such as quiche, which is to be protected from oxygen. If the exposure to atmospheric oxygen is for a sufficiently long time, its potency is almost completely lost.

Prior oxygen-absorbing compositions should theoretically have been prepared in an oxygen-free atmosphere to avoid premature oxidation to prevent partial or total loss of potency, depending on the length of exposure. However, preparation in a controlled oxygen-free atmosphere is impractical and costly. In addition, prior compositions, after formulation, theoretically should have been maintained in an oxygen-free atmosphere during handling to retain full potency before placement into the individual packets described above. Also, the packets, after having been filled, should have been maintained in an oxygen-free free atmosphere to avoid premature oxidation of the iron. Thus, in the past there had to be a minimum handling time for the oxygen-absorbing composition and packets under atmospheric conditions to prevent loss of potency.

In accordance with the present invention, an oxygen-absorbing composition is provided which at the time of formulation has components which absorb oxygen by a delayed reaction, that is, the composition does not absorb appreciable amounts of oxygen from the atmosphere during formulation and handling. It absorbs the oxygen after it is packaged with the product which it is to protect from oxidation. In other words, during the process of combining the ingredients, appreciable oxygen absorption does not occur immediately after they are combined, nor for a reasonable period of time thereafter, nor during packaging into packets, nor during storage of the packets in an oxygen-free atmosphere or one having a small amount of oxygen, nor during exposure of the packets to the atmosphere for a significant period of time after removal from their storage containers and placement into food containers, such as quiche containers, where they ultimately absorb oxygen to prevent deterioration of the food product due to oxidation.

The oxygen-absorbing composition of the present invention at the time of formulation comprises in relatively sufficient proportions to prevent appreciable absorption of oxygen from the atmosphere during formulation and handling, an oxygen-attracting component, an electrolyte-impregnated composition, and a water-attracting composition which has a greater affinity for water from the electrolyte-impregnated composition and a greater affinity for water vapor from the atmosphere than the oxygen-attracting component so that the water with the electrolyte therein cannot appreciably react with the oxygen-attracting component to thereby prevent the oxygen-attracting component from prematurely combining with the oxygen until such time as more of an equilibrium is reached between the electrolyte-impregnated component and the water-attracting component at which time the oxygen-attracting component can react with oxygen in the presence of the electrolyte.

The oxygen-attracting component is preferably iron in particle or powder form but may be any other metal or substance suitable of attracting and combining with oxygen. The oxygen attracting component may be, by way of example and not of limitation, other compounds of iron or other metals or compounds thereof, such as aluminum, zinc, nickel, copper, manganese, iron sulfide, iron oxide, iron hydroxide or other metals or compounds. The metals or compounds may be used by themselves or in combination.

The oxygen-attracting component may be present in an amount of between about 10% and 75% by weight and preferably between about 15% and 55% by weight and most preferably between about 20% and 40% by weight. The oxygen-attracting component may have a particle size of between about 40 mesh and 325 mesh and more preferably between about 75 mesh and 325 mesh and most preferably between about 100 mesh and 325 mesh. In fact, it may be of any suitable particle size.

The electrolyte-impregnated composition includes a carrier for the electrolyte which is preferably a silica gel but it may be any other composition, by way of example and not of limitation, such as bentonite, activated carbon, silica, alumina, or zeolite, or any other suitable compound. This electrolyte-impregnated composition, or mixtures thereof, may be of a particle size of between about 10 mesh and 300 mesh, and more preferably between about 20 mesh and 250 mesh, and most preferably between about 40 mesh and 200 mesh. In fact, it may be of any suitable particle size. The fact that the carrier for the electrolyte has a water-absorbing characteristic also aids in keeping the water away from the oxygen-absorbing component.

The electrolyte is preferably an aqueous sodium chloride solution. However, it may also be any other suitable salt solution which, by way of example and not of limitation, may include a salt such as ammonium chloride, ammonium sulfate, or other sodium, or potassium or ammonium halide salts. The aqueous sodium chloride solution may have a concentration of between about 1% and 14% of sodium chloride by weight, and more preferably between about 1% and 8% of sodium chloride by weight, and most preferably between about 1% and 6% of sodium chloride by weight. In fact, any suitable concentration may be used. Analogous percentages of the other salts may be used.

The electrolyte solution as a percentage of the total weight of the electrolyte-impregnated composition may be between about 5% and 42%, and more preferably between about 10% and 40%, and most preferably between about 20% and 38%.

The electrolyte impregnated composition, as noted above, forms one component of the composition, and may be present in an amount of between about 5% and 85% by weight, and more preferably between about 30% and 75% by weight, and most preferably between about 50% and 70% by weight. In fact, it may be present in any suitable amount.

The water-attracting composition is preferably a silica gel but it may be any other composition, by way of example and not of limitation, such as bentonite, activated carbon, silica, alumina, or zeolite, or any other suitable compound. This electrolyte-impregnated composition, or mixtures thereof, may be of a particle size of between about 10 mesh and 300 mesh, and more preferably between about 20 mesh and 250 mesh, and most preferably between about 40 mesh and 200 mesh. In fact, it may be of any suitable particle size.

The water-attracting composition, which is preferably dry silica gel as noted above, is as dry as possible and at the time of formulation should preferably not contain more than 2% of water by weight. This component can also be present in the amount of between 5% and 20% by weight, and more preferably between about 7% and 15% by weight, and most preferably between about 8% and 14% by weight. In fact, it may be present in any suitable amount.

In the preparation of the final composition, the proper proportion of silica gel is impregnated with the electrolyte solution to form the aqueous electrolyte-carrying component. Thereafter, the aqueous electrolyte-carrying component, the oxygen-attracting component and water-attracting component are mixed shortly before placement into the packaging shown in FIGS. 1–3, so that as little time as possible elapses before packaging. In the composition the water-attracting component has a greater affinity for the electrolytic solution than does the oxygen-attracting component, and it will therefore prevent the electrolyte from appreciably combining with the oxygen-attracting component and thus prevent it from absorbing oxygen from the air. Furthermore, the normal relative humidity of the environment is between about 30% and 70%, and the water-attracting component will have a greater affinity for water vapor from the air than does the oxygen-attracting component. Accordingly, electrolytic action cannot occur to cause the oxygen-attracting component to combine with the oxygen in the air. The foregoing is relatively significant in that it permits the composition to be formulated under normal environmental and atmospheric conditions without premature oxidation of the oxygen-attracting component.

It has been found that the composition which has been prepared in accordance with the preferred procedure can be exposed to the air for up to 36 hours at relative humidities below about 70% without appreciable oxidation. Above about 70% relative humidity, the time for appreciable oxidation is reduced. If mixed according to the other procedures, the time for oxidation is less. The composition, during the time that it is thus exposed to the atmosphere for the foregoing period, can be packaged into separate packets as described above. Thereafter, the packets are placed in hermetically sealed containers for shipment to food processors or the like. The amount of oxygen in the hermetically sealed containers is not significant and thus there will practically be no oxidation of the oxygen-absorbing component. Thus, the packets can have an almost indefinite shelf life while hermetically sealed within their storage or shipping containers. During the time of storage, the amount of water will tend to equalize between the electrolyte-impregnated composition and the water-attracting composition. However, during this period of storage there is no oxygen present so that the oxygen-attracting component cannot oxidize, and thus it retains its potency.

After the packets are removed from their hermetically sealed containers, they are exposed to atmospheric oxygen. However, at this time the normal atmospheric relative humidity is between about 30% and 70% so that there is no appreciable oxidation of the oxygen-attracting component because the water and water vapor absorbing components are still sufficiently dry so that they tend to keep the electrolyte away from the metal for a reasonable period of time required to place the packets in their ultimate food containers from which they are to absorb oxygen to prevent deterioration of the food product.

After one or more of the packets has been placed in a subsequently sealed container of a food product, such as quiche, they will over a period of time absorb the oxygen within the container and this absorption is enhanced by the fact that the relative humidity within the food container is approximately 90%, which enhances the activity of the electrolyte to thereby cause the oxygen-absorbing component to absorb the oxygen from the container and thus prevent it from deteriorating the food product.

A commercial composition was prepared having by weight about 29% of iron particles of a size of about 100 mesh, about 10% of dry silica gel having a particle size of between about 30 mesh and 200 mesh and wherein about 98% was retained at 200 mesh, and about 61% of electrolyte impregnated silica gel having a particle size of between about 30 mesh and 200 mesh and wherein about 98% was retained at 200 mesh and having a 6% of sodium chloride solution therein in an amount of about 36% of the foregoing 61%.

The particle size and distribution of the silica gel, both the impregnated and the dry, in the above commercial composition are as follows:

| Mesh Size | % Retained |
|---|---|
| 20 | 0 |
| 30 | 6 |
| 70 | 50 |
| 140 | 85 |
| 200 | 98 |

The above commercial composition was prepared by impregnating an amount of silica gel with the salt solution, and then mixing the dry silica gel, impregnated silica gel and iron particles together immediately prior to packaging.

The above commercial composition was tested by placing a packet of the above formulation in a container having a given volume of ambient air having approximately 20.8% oxygen. The air was at approximately 72° F. and approximately 50% relative humidity. It was found that after 36 hours the residual oxygen in the container was 19.7%, thereby indicating very little oxygen absorption during this period. Another packet of the commercial formulation was packaged with quiche in the same volume of atmoshperic air containing about 20.8% oxygen in a vapor barrier package wherein the relative humidity was about 89%. After 36 hours the oxygen in the quiche package was absorbed by the packet and the residual oxygen in the package was 0.15%. The foregoing data is shown on the graph of FIG. 4 and in the following table wherein the residual oxygen is shown at six hour intervals up to 36 hours.

| PERCENT RESIDUAL OXYGEN | | |
|---|---|---|
| Time | Ambient Air | With Quiche |
| 0 Hours | 20.8 | 20.8 |
| 6 Hours | 20.6 | 13.6 |
| 12 Hours | 20.5 | 9.5 |
| 18 Hours | 20.3 | 5.1 |
| 24 Hours | 20 | 2.74 |
| 30 Hours | 19.9 | 1.3 |
| 36 Hours | 19.7 | 0.15 |

It can thus be seen that the oxygen absorbing composition and packets are extremely "user friendly" because they are not activated to absorb oxygen from the atmosphere during handling or during storage but will only become really active for this purpose after they have been placed in a relatively high humidity container from which oxygen is to be absorbed.

It can thus be seen that the improved oxygen-absorbing composition, method of formulation thereof and packet of the present invention are manifestly capable of achieving the above-enumerated objects, and while preferred embodiments of the present invention have been disclosed, it will be appreciated that it is not limited thereto but may be otherwise embodied within the scope of the following claims.

What is claimed is:

1. An oxygen-absorbing composition which will not absorb appreciable amounts of oxygen from the atmosphere during formulation and handling comprising at the time of formulation in relatively sufficient proportions an oxygen-attracting component, an aqueous electrolyte-impregnated component, and a dry water-attracting component which has a greater affinity for water from said aqueous electrolyte-impregnated component than said oxygen-attracting component and a greater affinity for water vapor from the atmosphere than said oxygen-attracting component so that said aqueous electrolyte from said aqueous electrolyte-impregnated component cannot appreciably react with said oxygen-attracting component to thereby prevent said oxygen-attracting component from prematurely combining with atmospheric oxygen until such time as more of an equilibrium is reached between said electrolyte-impregnated component and said dry water-attracting component at which time said oxygen-attracting component can react with oxygen in the presence of said electrolyte from said electrolyte-impregnated component.

2. An oxygen-absorbing composition as set forth in claim 1 wherein said oxygen-attracting component is present by weight in an amount of between about 10% and 75% and wherein said aqueous electrolyte-impregnated component is present by weight in an amount of between about 5% and 85%, and wherein said dry water-attracting component is present by weight in an amount of between about 5% and 20%.

3. An oxygen-absorbing composition as set forth in claim 2 wherein said oxygen-attracting component is present by weight in an amount of between about 15% and 55%, and wherein said aqueous electrolyte-impregnated component is present by weight in an amount of between about 30% and 75%, and wherein said dry water-attracting component is present by weight in an amount of between about 7% and 15%.

4. An oxygen-absorbing composition as set forth in claim 1 wherein said oxygen-attracting component is present by weight in an amount of between about 20% and 40%, and wherein said aqueous electrolyte-impregnated component is present by weight in an amount of between about 50% and 70%, and wherein said dry water-attracting component is present by weight in an amount of between about 8% and 14%.

5. An oxygen-absorbing composition as set forth in claim 2 wherein said oxygen-attracting component comprises iron particles having a mesh size of between about 40 mesh and 325 mesh.

6. An oxygen-absorbing composition as set forth in claim 5 wherein said aqueous electrolyte-impregnated component and said dry water-attracting component comprise silica gel having a particle size of between about 10 mesh and 300 mesh.

7. An oxygen-absorbing composition as set forth in claim 5 wherein said aqueous electrolyte-impregnated component and said dry water-attracting component comprise silica gel having a particle size of between about 20 mesh and 250 mesh.

8. An oxygen-absorbing composition as set forth in claim 2 wherein said oxygen-attracting component comprises iron particles having a mesh size of between about 75 mesh and 325 mesh.

9. An oxygen-absorbing composition as set forth in claim 2 wherein said oxygen-attracting component comprises iron particles and wherein said aqueous electrolyte-impregnated component and said dry water-attracting component are silica gel.

10. An oxygen-absorbing composition as set forth in claim 9 wherein said aqueous electrolyte-impregnated component and said dry water-attracting component are silica gel having a size of between about 40 mesh and 200 mesh.

11. An oxygen-absorbing composition as set forth in claim 9 wherein said aqueous electrolyte-impregnated component and said dry water-attracting component are silica gel having a size of between about 20 mesh and 250 mesh.

12. An oxygen-absorbing composition as set forth in claim 9 wherein said aqueous electrolyte-impregnated component and said dry water-attracting component are silica gel having a size of between about 10 mesh and 300 mesh.

13. An oxygen-absorbing composition as set forth in claim 2 wherein said oxygen-attracting component is selected from the group of iron, aluminum, zinc, nickel, copper and managanese.

14. An oxygen-absorbing composition as set forth in claim 2 wherein said aqueous electrolyte-impregnated component and said dry water-attracting component are selected from the group of silica gel, bentonite, activated carbon, silica, alumina and zeolite.

15. An oxygen-absorbing composition as set forth in claim 1 wherein said oxygen-attracting component is iron particles which are present by weight in an amount of about 29% and are of a size of about 100 mesh, and wherein said aqueous electrolyte-impregnated component is impregnated silica gel of a particle size of between about 30 and 200 mesh and is present by weight in an amount of about 61%, and wherein said dry water-attracting component is silica gel having a particle size of between about 30 mesh and 200 mesh and is present by weight in an amount of about 10%.

16. An oxygen-absorbing composition as set forth in claim 1 wherein said composition is packaged in a packet having a transparent portion to permit viewing said composition, and wherein said oxygen-attracting component is iron which turns brown when it has absorbed oxygen to thereby permit evaluating the oxygen-absorbing capacity thereof.

17. A method of formulating an oxygen-absorbing composition under atmospheric conditions comprising the steps of providing a particulate oxygen-absorbing component, providing a dry liquid-absorbing component, providing an aqueous electrolyte-impregnated liquid-absorbing component, and mixing all of the foregoing components in the atmosphere so that said dry liquid-absorbing component having a greater affinity for water from said liquid-absorbing component and a greater affinity for water vapor from the atmosphere than said oxygen-absorbing component will prevent said electrolyte of said electrolyte-impregnated liquid-absorbing component from appreciably combining with said oxygen-absorbing component for a number of hours until after there has been an amount of absorption by said liquid-absorbing component of water from said electrolyte-impregnated liquid-absorbing component.

18. An oxygen-absorbing composition as set forth in claim 14 wherein said oxygen-attracting component is selected from the group of iron, aluminum, zinc, nickel, copper and manganese.

19. An oxygen-absorbing composition as set forth in claim 1 wherein said oxygen-attracting component is selected from the group of iron, aluminum, zinc, nickel, copper and manganese.

20. An oxygen-absorbing composition as set forth in claim 19 wherein said aqueous electrolyte-impregnated component and said water-attracting component are selected from the group of silica gel, bentonite, activated carbon, silica, alumina and zeolite.

21. An oxygen-absorbing composition as set forth in claim 1 wherein said aqueous electrolyte-impregnated component and said water-attracting component are selected from the group of silica gel, bentonite, activated carbon, silica, alumina and zeolite.

22. An oxygen-absorbing composition as set forth in claim 1 wherein said oxygen-absorbing composition is packaged in a package consisting of material which will transmit water vapor but is impervious to liquid water.

23. An oxygen-absorbing composition as set forth in claim 22 wherein said package includes a window which permits viewing of the composition therein.

* * * * *

UNITED STATES PATENT AND TRADEMARK OFFICE
CERTIFICATE OF CORRECTION

PATENT NO. : 4,992,410

DATED : February 12, 1991

INVENTOR(S) : John S. Cullen et al

It is certified that error appears in the above-identified patent and that said Letters Patent is hereby corrected as shown below:

Column 4, line 4, cancel "free" before the word "atmosphere".

Column 7, line 68 (claim 1), after "component" and before the comma insert --for combining with said oxygen-attracting component in the presence of oxygen to absorb oxygen--.

Column 8, line 10 (claim 1), after "oxygen" insert --during formulation and handling and--.

Column 9, line 15 (claim 13), after "group" insert --consisting--.

Column 9, line 20 (claim 14), after "group" insert --consisting--.

Column 10, line 4 (claim 17), after "component" and before the comma insert --for combining with said oxygen-attracting component in the presence of oxygen to absorb oxygen--.

Column 10, line 18 (claim 18), after "group" insert --consisting--.

Column 10, line 22 (claim 19), after "group" insert --consisting--.

Column 10, line 27 (claim 20), after "group" insert --consisting--.

Column 10, line 32 (claim 21), after "group" insert --consisting--.

Signed and Sealed this

Eighth Day of September, 1992

Attest:

DOUGLAS B. COMER

Attesting Officer

Acting Commissioner of Patents and Trademarks